May 17, 1932.  L. D. SOUBIER  1,859,247
APPARATUS FOR PRODUCING HOLLOW GLASSWARE
Filed April 16, 1928  4 Sheets-Sheet 1
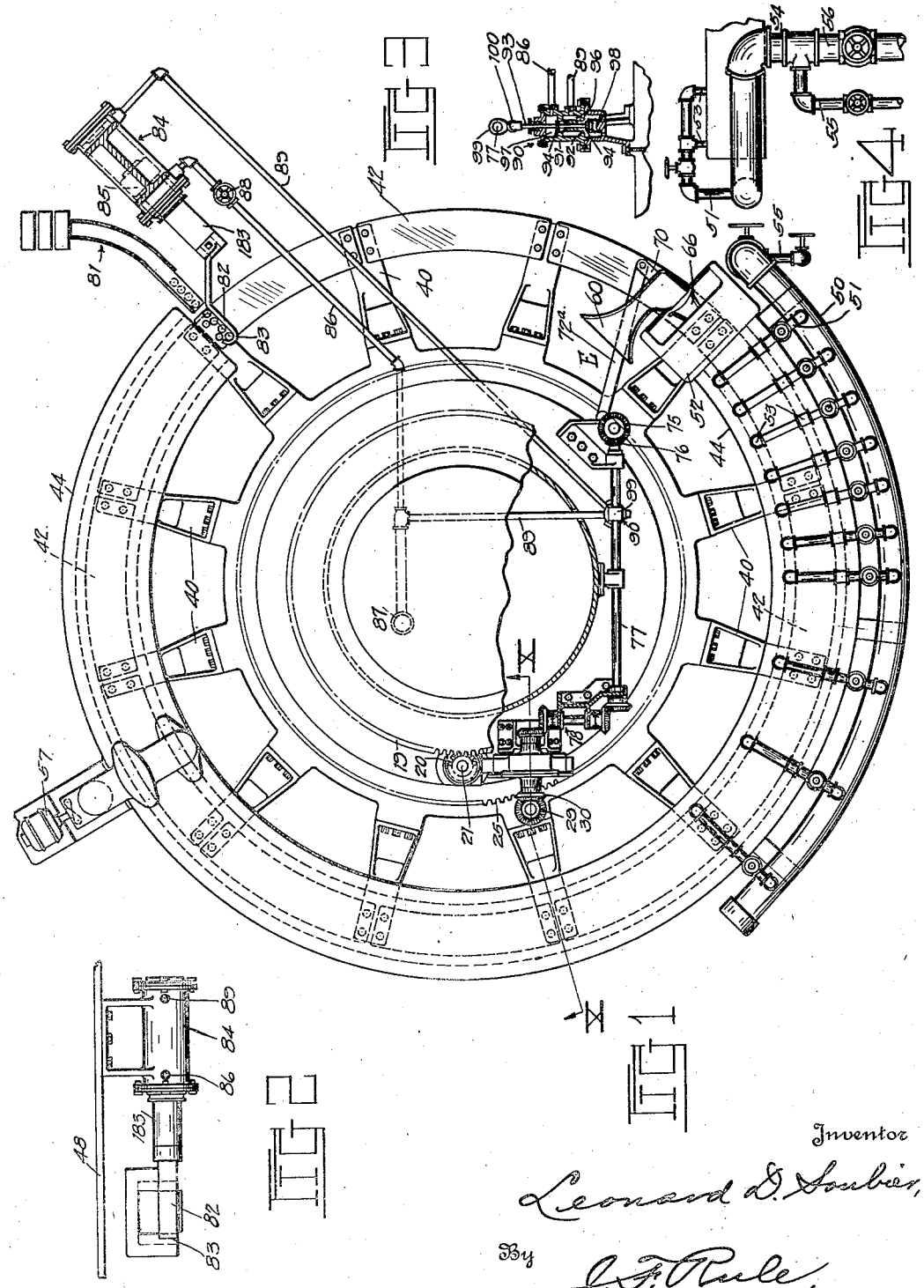
Inventor
Leonard D. Soubier,
By J. F. Rule,
Attorney May 17, 1932.  L. D. SOUBIER  1,859,247
APPARATUS FOR PRODUCING HOLLOW GLASSWARE
Filed April 16, 1928  4 Sheets-Sheet 2
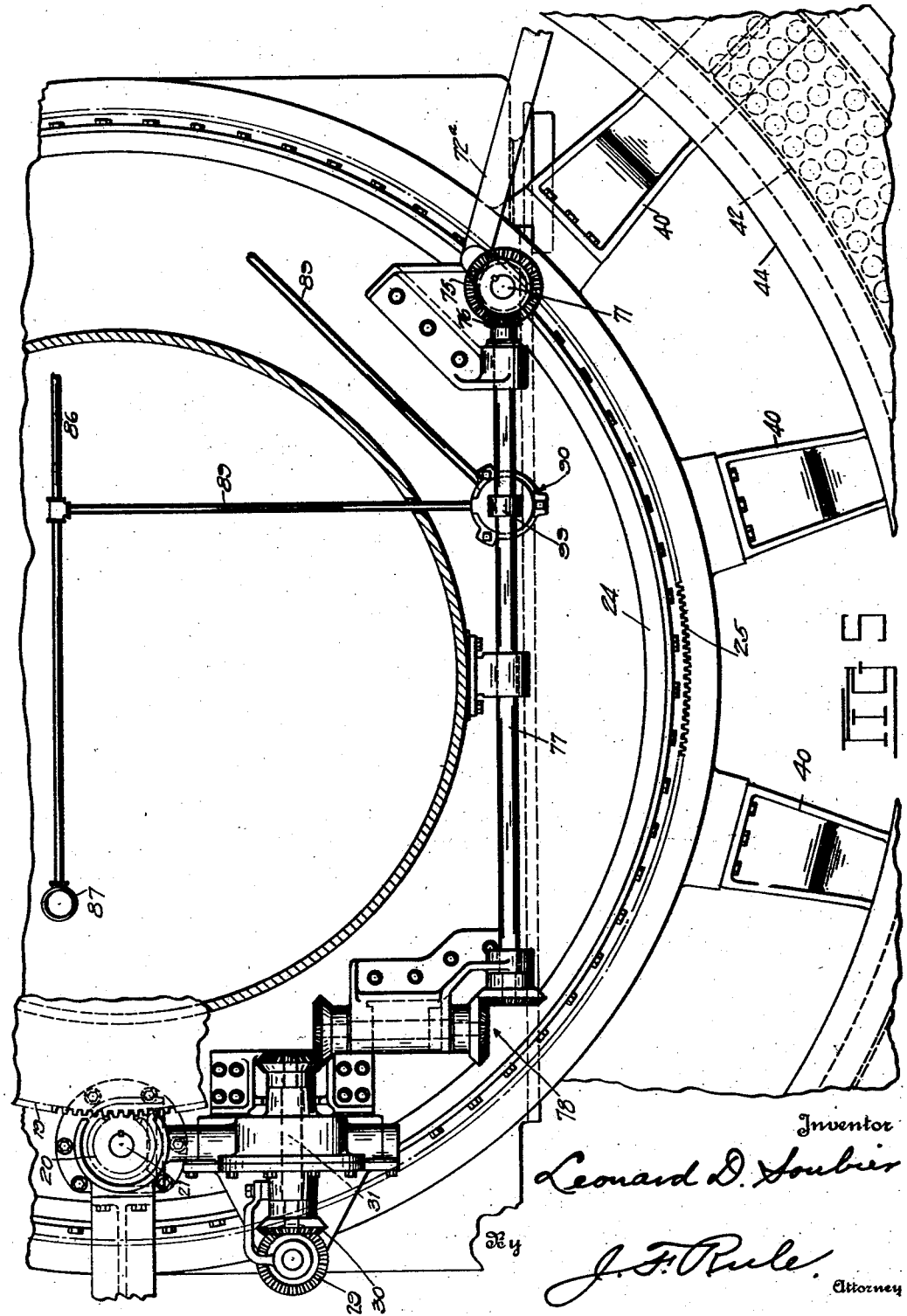
Inventor
Leonard D. Soubier
By
J. F. Rule
Attorney

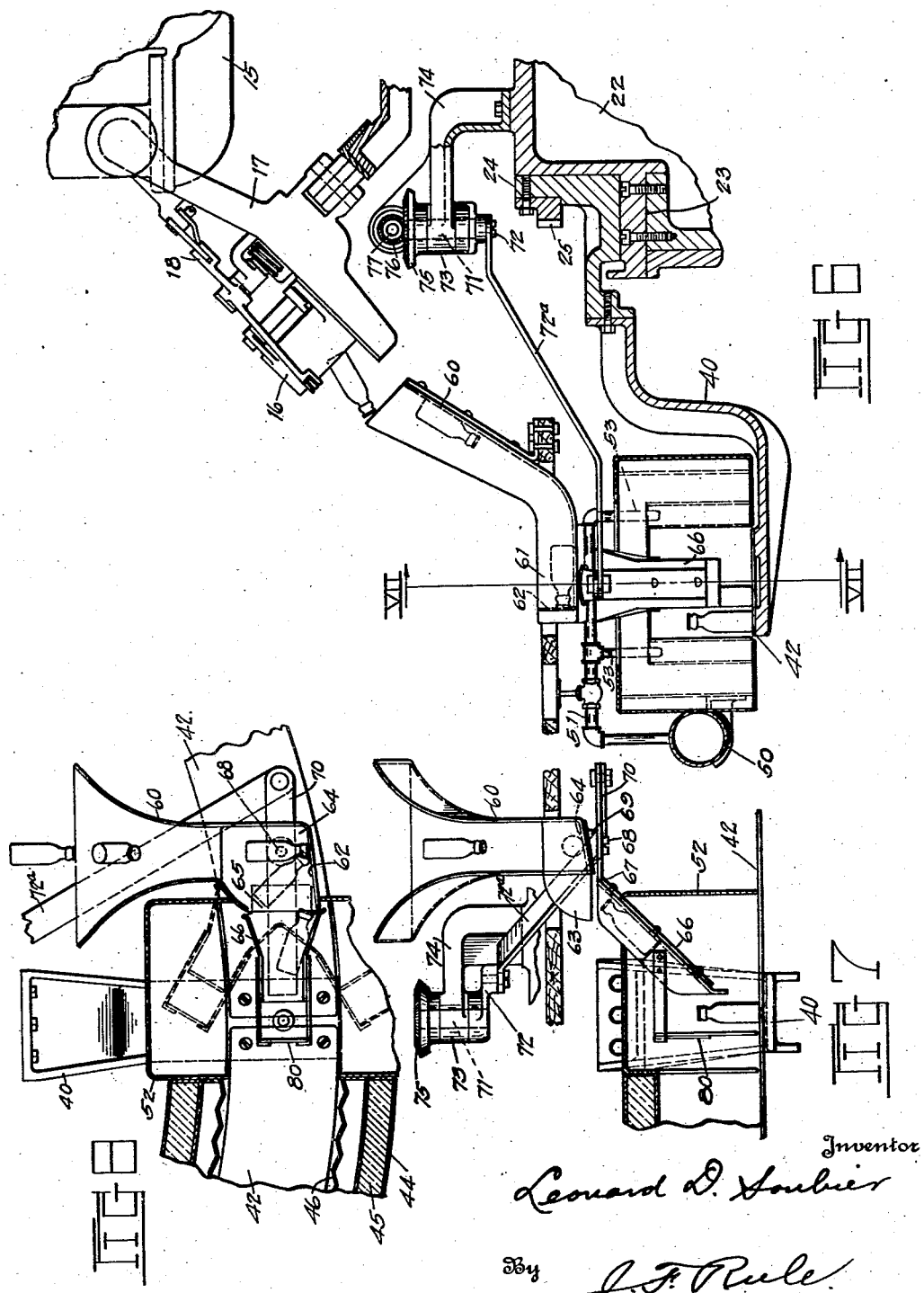

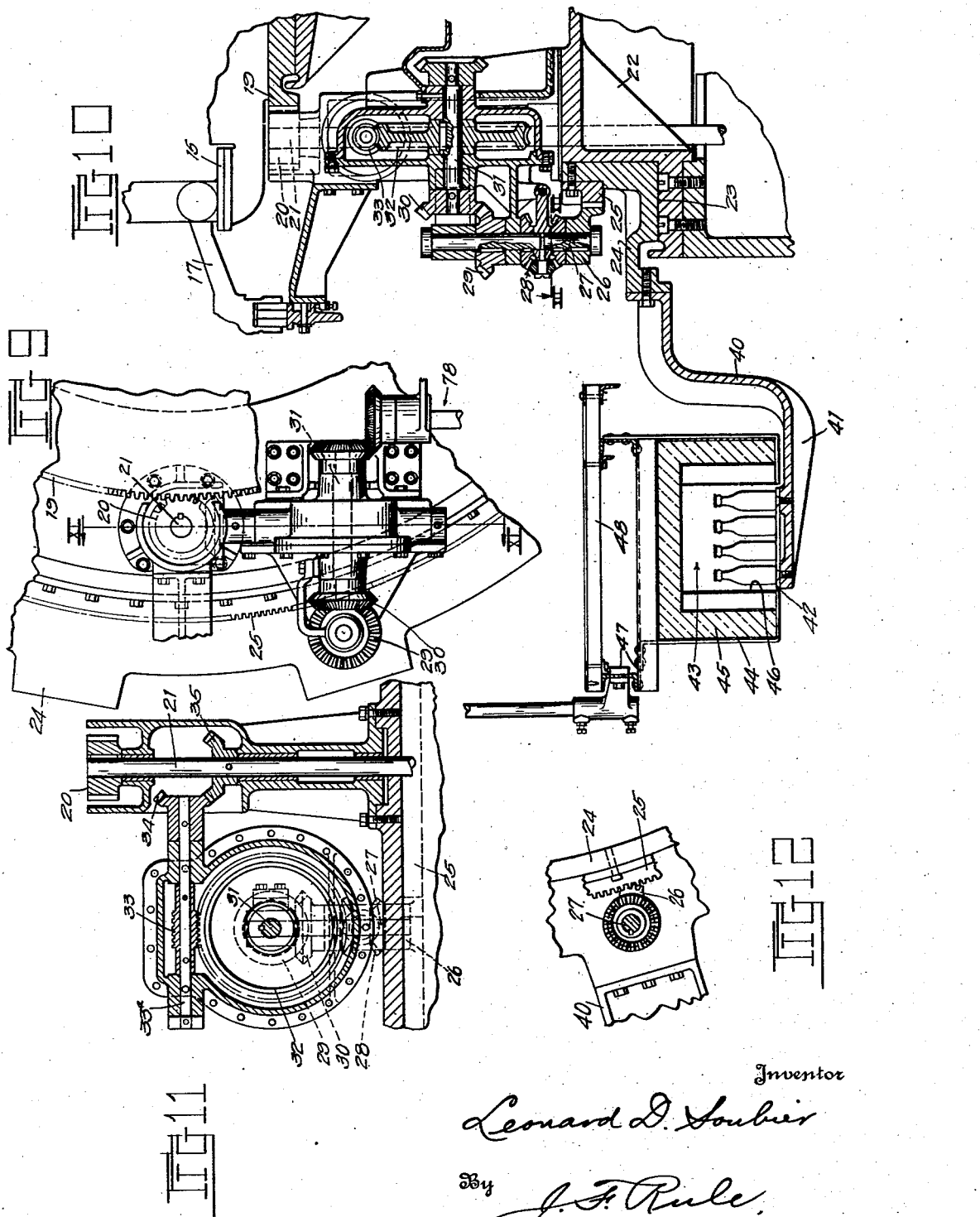

Patented May 17, 1932

1,859,247

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

APPARATUS FOR PRODUCING HOLLOW GLASSWARE

Application filed April 16, 1928. Serial No. 270,282.

The present invention relates to improvements in apparatus for producing hollow glassware.

In commercial production of hollow glassware, such for example as bottles, the ware in its final shape is delivered from a forming machine and then transferred either manually or mechanically by suitable ware handling mechanism into the feeding end of an annealing leer, the latter ordinarily being a considerable distance from the machine. The ware, during transfer from the machine to the leer, is more or less chilled by contact with the outside air and upon being placed in the leer must be reheated to remove strains and stresses therefrom. This reheating consumes a considerable period of time, as well as fuel, and must necessarily be followed by gradual reduction of the temperature as the ware passes through the leer to prevent formation of strains in the ware.

An object of the present invention is to provide an apparatus wherein exposure of the ejected ware to the chilling effect of the atmosphere while being transferred to the leer, is materially reduced and in fact almost eliminated. Thus, the extent of reheating, and consequently the annealing time may be greatly decreased as compared with ordinary methods. Also, a material reduction in fuel consumption is effected. To this end, the invention consists in arranging a glassware annealing leer about the periphery of a forming machine in such a manner that the ware is ejected directly into the leer from the molds and is initially positioned upright in the leer, said ware moving down a relatively short chute or trough from the machine to the leer.

Another object is to provide a leer of the above character embodying a feeding device by which the ware is uniformly spaced apart as it is deposited in the leer.

A further object is to provide a novel mechanism for removing ware from the delivery end of the leer in timed relation to feeding of ware into the opposite end of the leer.

It is also an object to provide a readily adjustable timing or indexing mechanism by which the leer conveyor may be advanced in a step by step fashion, degrees varying in length according to the type and size of ware to be annealed.

Other objects will be apparent hereinafter.

In the accompanying drawings:

Fig. 1 is a plan view with parts in section showing a forming machine frame supporting an annealing leer; molds and other ware forming mechanism being removed from the frame for the sake of clarity.

Fig. 2 is a side elevation of the ware takeout mechanism for the leer.

Fig. 3 is a sectional view through a valve which controls the application of variable air pressure to an air motor embodied in the ware takeout mechanism.

Fig. 4 is a fragmentary detail showing a portion of the leer heating means.

Fig. 5 is a fragmentary plan view showing the drive for the leer conveyor and a portion of the mechanism which actuates the leer feeder.

Fig. 6 is a transverse sectional view with parts in elevation illustrating the manner in which glassware is transferred from the finishing molds to the leer.

Fig. 7 is a sectional view taken substantially along the line VII—VII of Fig. 6.

Fig. 8 is a plan view with parts in section, of the mechanism shown in Figs. 6 and 7.

Fig. 9 is a fragmentary plan view of the driving connection between the forming machine and the leer.

Fig. 10 is a sectional view along the line X—X of Fig. 1.

Fig. 11 is a sectional view taken substantially along the line XI—XI of Fig. 9.

Fig. 12 is a sectional view taken along the line XII—XII of Fig. 10.

In the preferred embodiment of the invention illustrated in the accompanying drawings, an annealing leer is embodied in a ware producing unit also including a continuously rotating mold carriage 15 (Fig. 6) which supports an annular series of ware forming molds 16 each mounted on a tiltable frame 17. Suitable mold opening and closing mechanism 18 of conventional or any preferred type is employed. This mechanism alternately opens and closes the mold 16 and operates to discharge ware at the ejection station "E" (Fig. 1) when the mold tilts to the position shown in Fig. 6. The drive for rotating the mold carriage 15 is of conventional form, including a ring gear 19 (Figs. 1, 9 and 10) running in mesh with a driving pinion 20 at the upper end of a shaft 21 which may be continuously or intermittently rotated by any suitable means (not shown). This shaft 21 extends downwardly through the stationary base member 22 (Fig. 10) which is provided with an annular upwardly facing trackway 23 supporting a circular frame 24 on which the ware or leer conveyor 42 described hereinafter is mounted.

A ring gear 25 is secured to the frame 24 (Fig. 10) and runs in mesh with a mutilated indexing gear 26 at regular intervals. The indexing gear 26 periodically advances the leer conveyor 42 as will be apparent hereinafter. This indexing gear 26 (Fig. 10) is mounted on a sectional shaft 27 and is driven through an adjustable differential drive 28 of well known construction, by a bevel gear 29 running in mesh with a gear 30 fixed to one end of a horizontal shaft 31 carrying a worm gear 32. This worm gear 32 (Figs. 10 and 11) is continuously rotated by a worm 33 on a shaft 33ª on which is mounted a bevel gear 34 running in mesh with a driving bevel gear 35 which is rotated with and by the aforementioned drive shaft 21. Thus, with continuous rotation of the mold carriage 15, rotary motion is transmitted to the indexing gear 26 to thereby impart intermittent rotary movement to the supporting frame 24 for a leer conveyor 42, the extent of such intermittent movement being regulated by the size of the gear 26 and the number of teeth thereon. This latter feature is predetermined by the diameter of the ware being produced and annealed and the necessary spacing of the ware in the leer, as will be described hereinafter.

The circular frame 24 carries an annular series of conveyor supporting arms 40 whose outer portions 41 are disposed in a horizontal plane below that of their inner ends and have secured to their upper faces a circular ware conveyor 42 which may be composed of a series of individually removable sections.

The leer (Figs. 1 and 10) includes a tunnel 43 which is of inverted U-shape in cross section and closes the upper side of a major portion of the ware conveyor 42. This leer tunnel may be of any preferred construction and, according to the present disclosure, consists of a sheet metal shell 44 in which an insulating material 45 is arranged. The inner wall 46 may be formed of sheet metal having a bright reflecting surface, such as has been found advantageous in leer construction and operation. The leer tunnel may be suspended from a stationary floor 48 upon which the machine operators ordinarily stand, by means of angle iron members 47 or other hangers.

While other means may be employed to apply an annealing medium to ware in the leer, I have for illustrative purposes shown a heater using gas fuel, said heater comprising a manifold 50 extending lengthwise of the leer tunnel for a predetermined distance and equipped with branch pipes 51 extending transversely of the leer and having burners 53 extending downwardly therefrom into the leer tunnel. A fuel mixer 54 (Fig. 4) receives gas from any suitable source through a valved gas pipe 55, while the air supply is introduced through a valved pipe 56. The burners 53 are spaced along a predetermined length of the leer in a fashion determined by the type of ware being annealed and the temperature gradient required. A suction mechanism 57 (Fig. 1) may be arranged at a point spaced from the heating zone to create movement of the annealing medium longitudinally of the leer tunnel at the desired rate of speed.

According to the present disclosure, the leer conveyor 42 (Figs. 5 and 10) supports the ware in an annular series of transverse rows, each row including four bottles. Obviously, the rows may be composed of various numbers of bottles or other articles. The leer conveyor 42 remains stationary for a period of time sufficient to permit setting a transverse row of four bottles thereon and is then indexed by engagement between the gears 25 and 26 (Figs. 1 and 12), a distance corresponding to slightly more than the diameter of the bottles so that the next succeeding row of bottles will be spaced longitudinally from the preceding row. Mechanism operating to obtain such placing of the bottles or other ware upon the ware conveyor 42 includes a stationary chute 60 (Figs. 6, 7 and 8) formed with a substantially horizontally disposed lower outer portion 61. The outer end of this horizontally disposed portion 61 is formed with an end wall 62 provided with a laterally extending guard 63 (Fig. 7). The bottom 64 of the horizontally disposed portion 61 is downwardly inclined transversely toward an open side 65, through which the ware passes to a swinging trough or chute 66.

This latter trough or chute 66 is for the greater part enclosed in a chamber 52 and is fixed to a frame 67 fulcrumed at its upper inner end to a vertical hinge pin 68 carried by a boss 69 on the lower side of the horizontal portion 61 of the trough 60. This frame 67 includes an arm 70 (Figs. 5 and 7) extending beyond the hinge pin 68, connected by a pitman 72ª and crank arm 72 to a continuously rotating shaft 71. The shaft 71 is journalled in a bearing 73 on a stationary bracket 74 and carries a bevel gear 75 at its upper end running in mesh with a bevel gear 76 at one end of a horizontal shaft 77 (Figs.

5 and 6), the latter being continuously driven by the shaft 31 (Figs. 5 and 10) through a series of gears and shafts 78. Continuous rotation of the shaft 77 transmits rotary movement to the vertical shaft 71 (Figs. 5 and 7) which, through the pitman connection, causes oscillation of the trough 66 transversely of the ware conveyor 42.

In transferring bottles or the like to the leer, they are first deposited in the main chute 60 with their necks extending downwardly. These bottles move downwardly by gravity and upon reaching the horizontally disposed trough 61, strike the end plate or wall 62. Due to the inclination of the bottom 64, the bottles turn substantially as shown in Fig. 8 and move down the chute 66 in an upright position for setting upon the ware conveyor. A guard 80 (Figs. 7 and 8) fixed to the chute 66 prevents contact between a row of bottles being set up and the preceding row.

At the delivery end of the leer, I provide a takeout mechanism by which the ware is removed from the conveyor 42 one row at a time and placed on suitable ware handling mechanism 81 by which it may be transported to any desired point. This takeout mechanism (Figs. 1 and 2) comprises an arm 82 having one end 83 shaped to engage an end bottle of a transverse row, while the other end of this arm is offset and connected to a piston rod 183 of an air motor 84, said motor including a differential piston 85. Constant air pressure is supplied to the inner end of the air motor cylinder through a pipe 86 from a high pressure supply line 87, said pipe 86 including a valve 88 by which the rate of flow may be controlled. Variable air pressure is periodically supplied to the other end of the air motor 84 through a sectional pipe 89 in which an automatic valve 90 is arranged.

The automatic valve 90 (Figs. 1, 3 and 5) comprises a housing 91 formed with three chambers therein, communicating with each other through valve openings 92. A valve stem 93 extending axially through said openings and housing carries a pair of spaced valve disks 94 adapted to close the openings 92 one at a time whereby the intermediate chamber 96 alternately communicates with the upper and lower chambers 97 and 98, respectively, the latter chamber opening to the atmosphere. The sections of the variable air pressure pipe 89 are connected to the intermediate and upper chambers 96 and 97.

Raising of the valve stem 93 seats the lower valve disk 94 and unseats the upper disk, whereupon air pressure passes through the pipe 89 and moves the piston 85 of the air motor 84 inwardly whereby the takeout arm may engage a transverse row of bottles for removal from the leer conveyor 42. The automatic valve 90 is actuated in proper timed relation to movement of the ware conveyor by a cam 99 on and rotatable with the shaft 77 (Figs. 1 and 5), said cam engaging a cam roll 100 on the upper end of the valve stem 93.

The operation of the machine may be stated as follows:

Assuming that the ware forming machine 70 is of the type in which the mold carriage rotates continuously about a vertical axis (although it may well be of the intermittently rotating type), the finish molds 16 are brought in succession to the ware ejecting station "E" at which the molds tilt and open as illustrated in Fig. 6 to thereby deposit finished articles of ware in the chute or trough 60 at regular intervals. The ware enters the chute 60 in an inverted position and upon striking the end wall 62 and the inclined bottom 64 (Fig. 8), moves by gravity transversely of the trough and is reinverted so that it moves down the oscillating trough 66 in an upright position and is set upright on the ware conveyor 42 (Fig 7). This oscillating chute or trough 6 continuously moves back and forth across the ware conveyor 42 at a rate of speed determined by the rotary speed of the mold carriage. With movement of the trough 66 across the ware conveyor 42 in one direction, one complete row of bottles will have been placed in an upright position on the ware conveyor. In the interval of time preceding initial return movement of the trough, the leer conveyor 42 is indexed to advance the row of articles just deposited on the conveyor, a distance beyond the feeding point sufficient to allow uninterrupted return of the trough to its initial position. During this return movement, another row of articles is deposited upon the conveyor and the latter is again indexed. Thus, by the intermittent movement of the leer conveyor 42, the ware is slowly carried through the leer tunnel wherein it is annealed in the customary manner and is removed from the ware conveyor at the delivery end of the tunnel by the takeout mechanism previously described.

This air motor 84 for the takeout mechanism (Fig. 1) is operated in timed relation with indexing of the conveyor and oscillation of the trough 66. Thus, simultaneously with movement of a row of ware into the receiving end of the leer, a row is moved from within the tunnel and is removed from the leer conveyor 42 by the takeout mechanism. The automatic valve 90 (Figs. 1 and 3) is periodically operated by the rotary cam 99 on the shaft 77 which, through the pitman connection, oscillates said trough 66. The position of the cam 99 on the shaft 77 (Fig. 3) determines the relation between the operation of the air motor 84 of the takeout mechanism and movement of the feeding trough 66 which spaces the ware in transverse rows across the ware conveyor 42 at the feeding end of the leer.

The timing gear 26 (Figs. 1 and 12) advances the ware conveyor 42 in a step by step fashion, or as otherwise desired, in timed relation to oscillation of the trough 66, there being provided a plurality of gears so proportioned and related to each other that indexing of the conveyor is effected immediately following placing of a complete transverse row of bottles or other ware on the conveyor. The size of the gear 26 and the number of teeth thereon, vary in accordance with the size of ware to be annealed, it being obvious that ware of relatively large diameter will require a greater degree of movement of the conveyor 42 than will ware of small diameter.

By adjusting the differential 28 (Fig. 10), the timed relation between movements of the ware conveyor 42 and the oscillating chute 66 may be varied. For example, if the conveyor is being indexed just prior to or during positioning of the last of a row of bottles thereon, it is necessary to retard the operating period of the indexing gear 26. Accordingly, the differential mechanism 28 is operated to retard the time of advance of the conveyor the necessary degree. This adjustment moves the teeth of the indexing gear 26 backward a predetermined degree and correspondingly retards the period of initial movement of the conveyor 42. Obviously, the reverse adjustment is effected if the conveyor movement is too late.

By combining a ware forming machine and annealing leer as herein set forth, a compact ware producing unit is provided and the period of time required for complete formation and annealing of ware may be materially shortened. This latter feature is to a considerable extent due to placing the feeding end of the leer in proximity to the ware ejecting station so that the ware may be quickly transferred to the leer and is not chilled to any great extent by the atmosphere. Consequently, the ware does not require a relatively long period of heating as in the usual leer.

Modifications may be resorted to within the spirit and scope of the appended claim.

What I claim is:

In combination, a machine for molding glass articles comprising a mold carriage, driving mechanism operable to rotate the carriage continuously about a vertical axis, means on the carriage for molding articles and periodically discharging them in succession at regular intervals at a discharging station, a lehr including a tunnel and a lehr conveyor extending therethrough, automatic mechanism for receiving the articles as they are discharged from the mold carriage and placing them in transverse rows on the lehr conveyor with a predetermined number of articles in each row, mechanism for intermittently advancing the lehr conveyor including driving connections between said conveyor and the carriage driving mechanism by which the conveyor is positively actuated at predetermined intervals, said intervals being equal to the time intervals between the placing of each two succeeding transverse rows of articles on the conveyor, whereby the conveyor is advanced after each row of articles placed thereon, automatic take-out mechanism operating at the discharge end of the lehr tunnel and operable to remove the articles from the lehr conveyor one row at a time, means operated and controlled by the said carriage driving mechanism for effecting the operation of the take-out mechanism after each said step movement of the lehr conveyor and in synchronism with said movements of the conveyor, said lehr conveyor comprising an annular platform completely surrounding and concentric with said axis of the mold carriage, and said lehr tunnel extending concentrically with said axis along the major portion of the length of said conveyor.

Signed at Toledo, in the county of Lucas and State of Ohio, this 11th day of April, 1928.

LEONARD D. SOUBIER.